(12) United States Patent
Garms et al.

(10) Patent No.: US 7,689,999 B2
(45) Date of Patent: Mar. 30, 2010

(54) SHARING DYNAMICALLY CHANGING RESOURCES IN SOFTWARE SYSTEMS

(75) Inventors: Jess Garms, Seattle, WA (US); Britton Worth Piehler, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 1495 days.

(21) Appl. No.: 11/000,800

(22) Filed: Dec. 1, 2004

(65) Prior Publication Data
US 2006/0117320 A1 Jun. 1, 2006

(51) Int. Cl.
G06F 9/46 (2006.01)
G06F 12/00 (2006.01)

(52) U.S. Cl. .................... 718/104; 707/203

(58) Field of Classification Search .......... 718/1–108; 707/203; 719/310; 715/251, 234
See application file for complete search history.

(56) References Cited

U.S. PATENT DOCUMENTS

| 4,742,450 | A  | * | 5/1988  | Duvall et al. ........... 719/310 |
|-----------|----|---|---------|----------------------------------|
| 6,292,889 | B1 | * | 9/2001  | Fitzgerald et al. ........ 713/1 |
| 6,327,594 | B1 |   | 12/2001 | Van Huben et al. ....... 707/200 |
| 6,360,363 | B1 |   | 3/2002  | Moser et al. ............ 717/170 |
| 6,754,659 | B2 |   | 6/2004  | Sarkar et al. ........... 707/10 |
| 6,857,012 | B2 |   | 2/2005  | Sim et al. .............. 709/222 |
| 7,047,522 | B1 |   | 5/2006  | Dixon et al. ............ 717/131 |
| 7,127,712 | B1 |   | 10/2006 | Noble et al. |
| 2002/0091721 | A1 | * | 7/2002 | Mcbride et al. .......... 707/203 |
| 2002/0120648 | A1 | * | 8/2002 | Ball et al. ............... 707/511 |
| 2002/0188935 | A1 |   | 12/2002 | Hertling et al. |
| 2003/0167455 | A1 |   | 9/2003  | Iborra et al. |
| 2004/0024812 | A1 |   | 2/2004  | Park et al. |
| 2004/0093604 | A1 | * | 5/2004 | Demsey et al. ........... 719/310 |
| 2005/0154699 | A1 |   | 7/2005  | Lipkin et al. |
| 2006/0168226 | A1 | * | 7/2006 | Miller et al. ............ 709/226 |

OTHER PUBLICATIONS

Duvall EP 0238158 A2, write segment sharing in a virtual memory, virtual machine data processing system, Sep. 23, 1987.*

* cited by examiner

*Primary Examiner*—Meng-Ai An
*Assistant Examiner*—Willy W Huaracha
(74) *Attorney, Agent, or Firm*—Squire, Sanders & Dempsey, L.L.P.

(57) ABSTRACT

A system and method for sharing a set of resources among a plurality of processes, comprising creating a version of a resource for each one of the plurality of processes that requires access to the resource wherein a version of the resource is one of: 1) a representation of the resource at a particular point in time; and 2) a transformation of the resource; making each of the created versions available to the plurality of processes; and notifying a process in the plurality of processes when a resource in the set of resources upon which the process requires access is updated.

14 Claims, 4 Drawing Sheets

SHARING DYNAMICALLY CHANGING RESOURCES IN SOFTWARE SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates generally to compilation systems, interactive development environments, and file editors, debuggers, and other software development tools.

BACKGROUND

The sharing of resources has become commonplace in software development. Shared resources such as software libraries quicken the pace of development. But shared resources can also create a number of problems for development environments where more than one process can simultaneously access and modify a shared resource. For example, one software developer can modify a shared library using an Interactive Development Environment (IDE) while another developer simultaneously uses a debugger to step through the shared library's code. Any changes one developer makes to the shared resource have the potential of interfering with the development of the other.

IDEs, editors, compilers, analyzers, debuggers, and the like, also frequently gain possession of shared resources to the exclusion of other processes for the duration of certain operations (e.g., updating the resource). This can prevent other processes from modifying the resource. While this problem can be solved by terminating all processes attached to the resource, this proves impractical for two reasons. First, as the number of shared resources grows, the number of processes which need to be stopped and started becomes unmanageable. Second, this turns out to be an inconvenient solution for the developer and wastes valuable development time.

Furthermore, given that one shared resource may depend on one or more other shared resources, there can be a complex set of dependencies between the resources. Modifications to a resource may result in changes (e.g. recompilation) to its dependants. Changes to those dependants may result in changes to their dependants, and so on. A developer is faced with manually managing this complex set of dependencies and computing how changes to one resource affect other dependent resources. As the number of resources and dependencies increases, these tasks become unmanageable. The developer may be forced into a trial and error process of testing each resource to ensure it has the correct versions of dependent resources. Or, the developer may resort to a monolithic build process for all resources under development to ensure that the current versions of all resources are being used. What is needed is better way for different processes to freely access and/or modify shared resources without conflicting with each other.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

A process can perform mathematical, logical, input/output and other operations according to programmed instructions. By way of non-limiting illustration, a process can include one or more of the following: an executable program, a thread of execution, a processor-level thread of execution, a task, a sequence of states, and any other suitable process. For example, in an IDE the compiler, editor, debugger and other services can each be a process. A process can utilize one or more computing devices and/or processors. Such devices and/or processors can be connected by one or more buses and/or networks. This disclosure is not dependent on any particular type of process, network, bus, computing architecture, computing device or processor. It will be apparent to those of skill in the art that a process can embody many more forms that are listed here while still being fully within the scope and spirit of this disclosure. A resource can be shared among processes and versions (e.g., a copies) of it can be made. By way of non-limiting illustration, a resource can include one or more of the following: source code, a file, a document, a library, an archive (e.g., a Java® archive), an object, a data structure, a database, a process, a service, a deployment descriptor, a program and any other suitable resource. This disclosure is not dependent on any particular type of resource. It will be apparent to those of skill in the art that a resource can embody many more forms that are listed here while still being fully within the scope and spirit of this disclosure.

Figure 1:
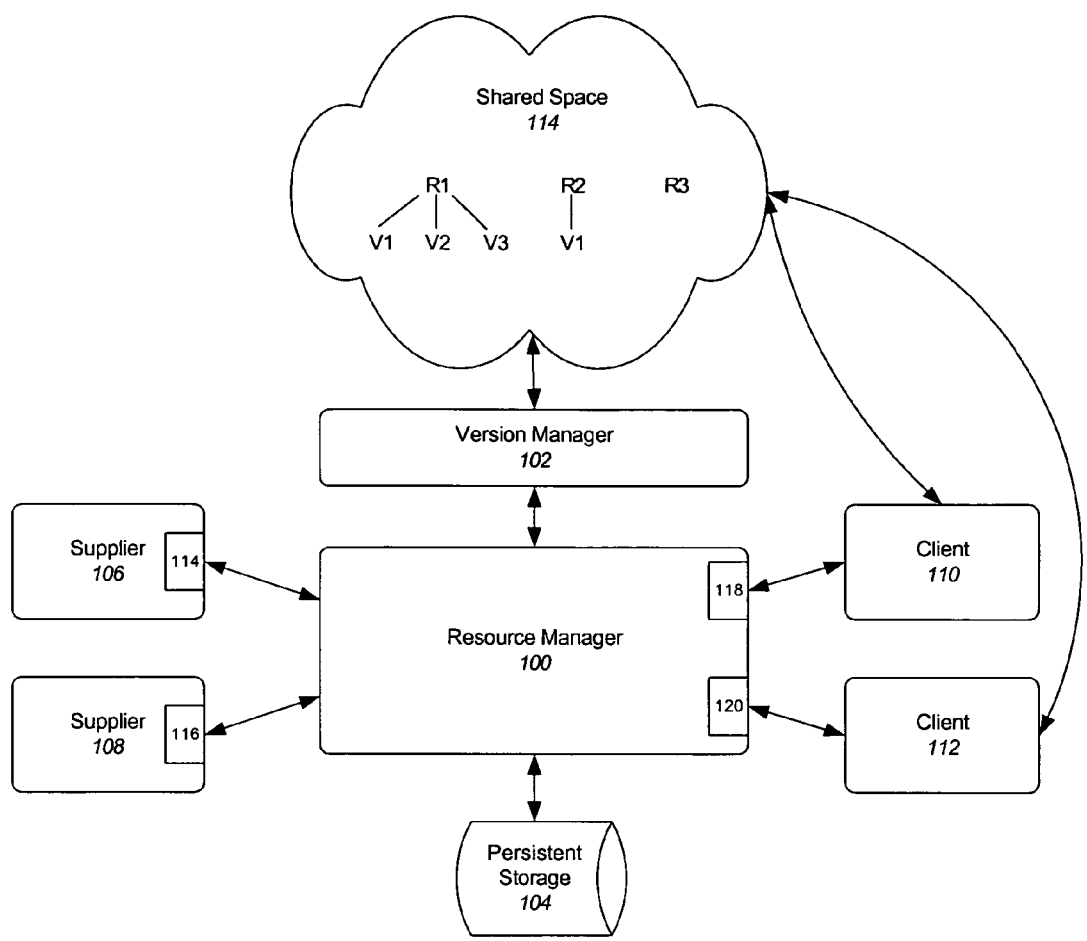
FIG. 1 is an illustration of a shared resource management system in accordance to various embodiments.

FIG. 1 is an illustration of a shared resource management system in accordance to various embodiments. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

A resource manager 100 can coordinate access to one or more shared resources (R1, R2, R3) among one or more client processes (110, 112) and one or more shared resource supplier processes (106, 108) which supply the shared resources. In one embodiment, the resource manager is embodied in a Java® run-time class path manager. A process can be both a supplier and a client. A client can access one or more shared resources. The resource manager can keep track of changes that occur to shared resources in order to assist clients that want the latest versions of a resource. In one embodiment, the resource manager returns an interface (114, 116) to each supplier which can be used by the supplier to notify the resource manager that a shared resource has been modified.

There are many different ways the resource manager can determine which resources are shared. In one embodiment, a supplier can register shared resource(s) with the resource manager. Registration can provide the resource manager with the location and/or identity of the resource. By way of non-limiting illustration, a shared resource's location and/or identity can include one or more of the following: location(s) of the file(s) that comprise the resource, a uniform resource locator (URL) for the resource, and any other suitable means for identifying a resource and/or its location. In another embodiment, shared resources can be implicitly registered when a client provides to the resource manager a resource list containing one or more shared resources it wishes to use. In aspects of this embodiment, the resource list is a Java® class path. Each resource in the client's resource list can be registered for tracking by the resource manager. Many others ways for identifying shared resources are possible but are omitted for the sake of clarity. It will be apparent to those of skill in the art that the present disclosure is not dependent on any particular means for identifying shared resources. In one embodiment, a client can provide a callback interface (118, 120) to the resource manager which can be used by the resource manager to dynamically notify the client when a shared resource is modified.

The resource manager can direct the version manager 102 to maintain separate versions of the shared resource in shared space 114 for access by clients. In one embodiment, a version of the resource is not created until it is requested by a client. Maintaining versions of resources allows the original resource to be modified freely by the supplier without interference from clients. By way of non-limiting illustration, the shared space can be a file system, a name space, a directory service, and/or any other system through which the one or more clients can access versions of shared resources. In this illustration, resource R1 has three versions (V1, V2, V3), resource R2 has one version (V1) and resource R3 has no versions of itself. In one embodiment, a version of a resource is a copy of that resource (and its constituent parts, if any) at a given point in time. For example, if a resource was comprised of a set of source code files, a copy of each file would constitute a version of the resource. In another embodiment, a version of a resource is the result of performing a transformation on the resource (and its constituent parts, if any). In aspects of these embodiments, a version can be created by the version manager or by the resource itself.

In one embodiment, the version manager assigns a unique identifier to each version (and its constituent parts, if any) in the shared space. For example, if a resource was comprised of a set of source code files and the shared space was a file system, each file would have a unique file name in the shared space. For example, file names can be formed by combining the name of the resource with a number to indicate the number of the version (e.g., myLibrary1, myLibrary2, etc.). In one embodiment, the resource manager provides the client a list of version identifiers corresponding to shared resources requested by the client. In one embodiment, the list of version identifiers corresponds to the list of resources originally submitted to the resource manager by the client, but with any shared resources replaced by version identifiers/locations for the corresponding resource. In one embodiment, the resource manager returns to the client an updated class path wherein resource identifiers/locations in the class path have been replaced with version identifiers/locations. The client may then hold onto the returned version list for as long as it likes. All versions included on the list can remain available until the client discards the list. For example, if a version corresponds to one or more files, the client may open and read the files on the list and keep the files open as long as it requires without interfering with other clients or the supplier(s) of the resources.

In one embodiment, to ensure that the latest version of a shared resource is being used by all clients, a supplier of the resource sends a notice to the resource manager to indicate that the resource has been modified. This notification can be dynamically (i.e., immediately) propagated by the resource manager to clients who use the shared resources via callback interfaces. In another embodiment, the propagation to clients can occur at a later time. The notification indicates that a new version of the resource (and their constituent parts, if any) is available. After a client receives a notification that a shared resource has been modified, the client can request an updated version list from the resource manager containing identifiers/locations for the latest versions of resources (and its constituent parts, if any). When the resource manager receives such a request, it can examine the original version list provided to the client and replace any out-of-date version identifiers with new version identifiers. The updated version list is then returned to the client. In one embodiment, the resource manager waits for a client to request an updated resource list before directing the version manager to create a new version of a resource. This can avoid the unnecessary creation of multiple versions of a shared resource which may never be accessed by the client.

Because a client may hold onto as many version lists as it wants for as long as it chooses to do so, it is possible to have multiple versions of a shared resource in use at the same time. In one embodiment, the version manager can maintain a reference count for each version of a resource in order to know when it is safe to delete a version of a shared resource. The reference count for a version is incremented once for each client version list the version is included on and decremented once for each client version list which is discarded. When the reference count for a version reaches zero, the version is no longer needed by clients and may be removed by the version manager. In one embodiment, the most recent version of a shared resource is never deleted. This avoids possibly having to recreate the same version again.

The resource manager and the version manager may store all of their internal state in persistent storage 104 so they can be reinitialized to an identical state. This allows a software developer to shutdown the IDEs, compilers, debuggers and other systems which use the managers and restart them in the same state prior to shutdown without requiring additional files to be copied. For example, the version manager may store information pertaining to all shared resources and corresponding versions including reference counts. The version manager can also store the contents of the shared space. In one embodiment, when the resource manager is reinitialized, it consults with the version manager to become aware of shared resources available to clients. Suppliers and clients may re-register themselves for notifications. The resource and version managers may then operate normally as described above. Storing state at shutdown increases the speed and efficiency of the managers and of the tools which use them.

Figure 2:
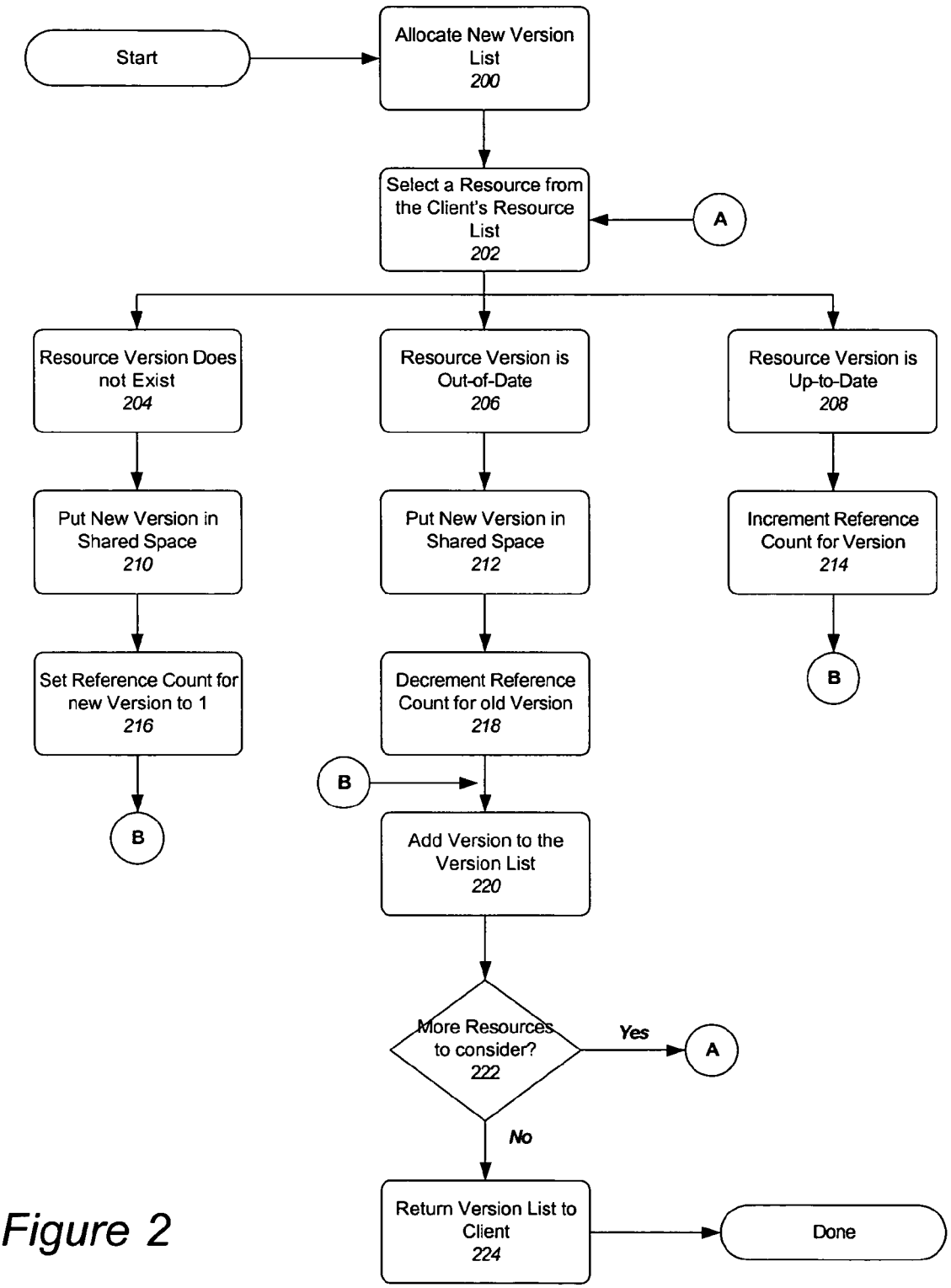
FIG. 2 is flow diagram for building a version list based on resource list in accordance to various embodiments.

FIG. 2 is flow diagram for providing a version list based on resource list in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In one embodiment, a client can submit a resource list to the resource manager wherein the resource list contains resources which the client desires to use. Upon receipt of the resource list, the resource manager allocates a new version list in step 200. Next, a resource is selected from the resource list in step 202. If a version of the selected resource does not exist in the shared space (step 204), the version manager creates a new version in the shared space (step 210) and the reference count for the new version is set to 1 (step 216). Next, the new version is added to the version list that will be returned to the client (step 220). If the version of the selected resource exists but is out-of-date (e.g., the selected resource has been updated since the version was created) (step 206), a new version is created in the shared space (step 212) and the reference count of the old version is decremented (step 218). The new version is then added to the version list (step 220). If the selected resource has an up-to-date version (step 208), the version's reference count is incremented (step 214) and the version is included in the version list (step 220). At step 222, it is determined whether there are more resources to examine in the client's resource list. If so, the process continues at step 202. Otherwise, the version list is returned to the client (step 224).

Figure 3:
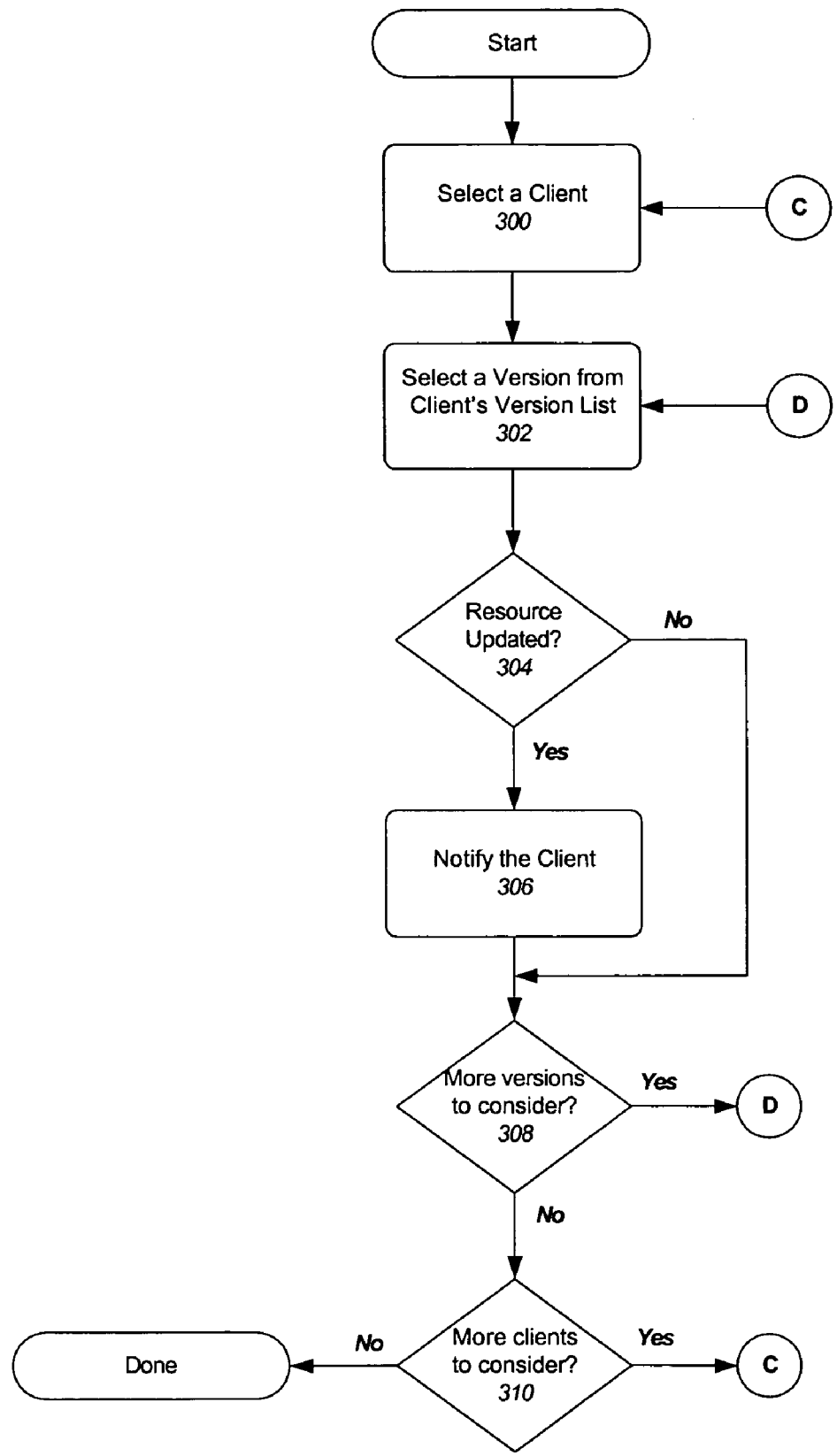
FIG. 3 is flow diagram for notifying clients of updates to shared resources in accordance to various embodiments.

In one embodiment, when a new version of a shared resource becomes available, the resource manager notifies all clients using the resource of such. FIG. 3 is flow diagram for notifying clients of updates to shared resources in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In one embodiment, a client is selected (step 300) from all available clients that have registered callback interfaces with the resource manager. For the selected client, a version of a shared resource is selected from the client's version list (step 302). If the resource corresponding to the version has a modification date that is later than the creation date of the version (step 304), the client is notified of the update via its callback interface (step 306). Once notified, a client can request an updated version list. If additional versions are available in the version list, the process continues at step 302 with another version from the version list. If no additional versions remain to be considered and there are additional clients to consider (step 310), the process continues at step 300. Otherwise, the process completes.

Figure 4:
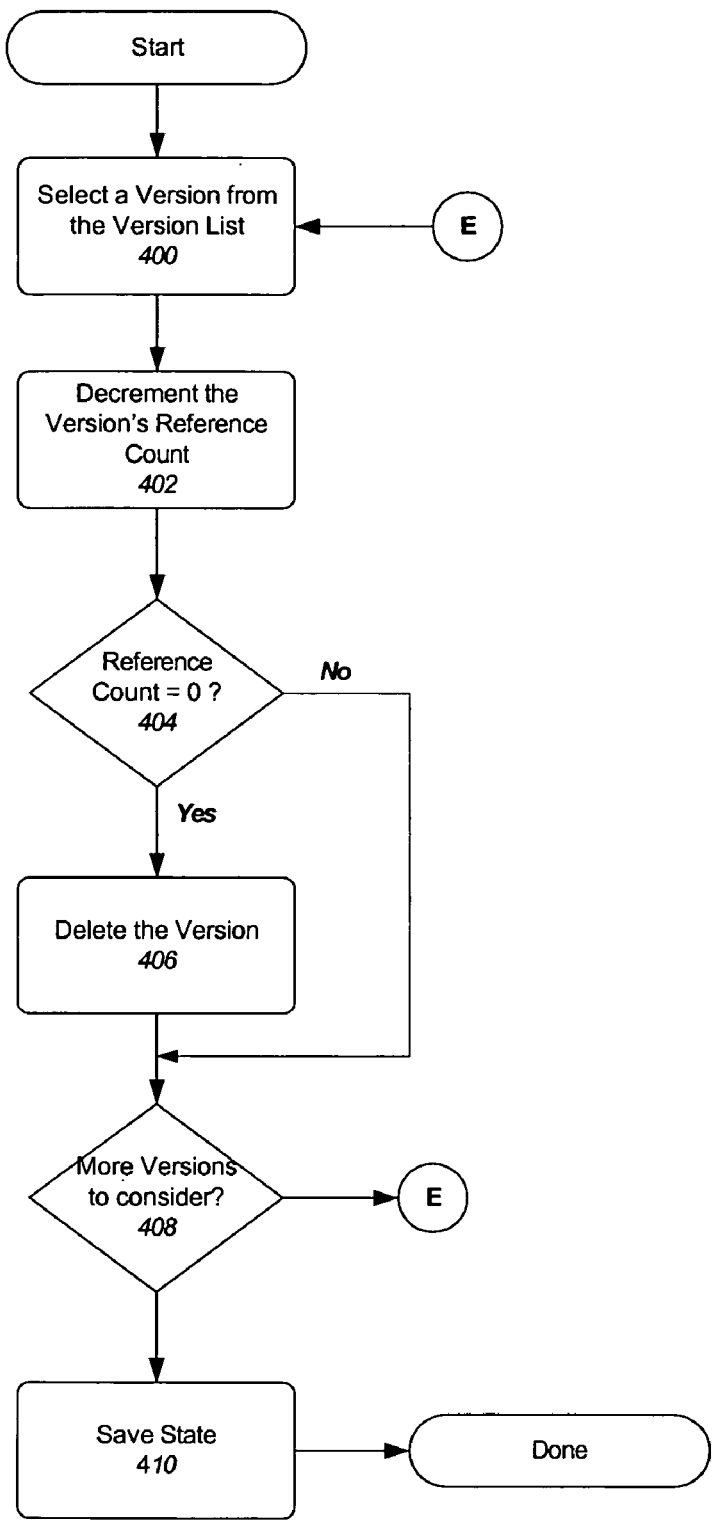
FIG. 4 is flow diagram for releasing a version list in accordance to various embodiments.

In one embodiment, when a client releases a version list, the version manager can delete any versions of shared resources which are no longer needed. FIG. 4 is flow diagram for releasing a version list in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In one embodiment, a version is selected (step 400) from the version list that is being released and its reference count is decremented (step 402). If the reference count for the version is equal to zero (step 404), the version is deleted (step 406). Step 408 determines if there are more versions to consider in the version list. If so, the process continues at step 400. Otherwise, the version manager saves its state to the persistent store (step 410) and the process completes.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented method for sharing a set of resources among a plurality of processes, comprising:

for each resource in the set of resources, creating a version of a resource for each one of the plurality of processes that requires access to the resource wherein a version of the resource is one of: 1) a representation of the resource at a particular point in time; and 2) a transformation of the resource;

making each of the created versions available to the plurality of processes; and notifying a process in the plurality of processes when a resource in the set of resources upon which the process requires access is updated, wherein the creating the version of the resource further comprises:

receiving a resource list from a process of the plurality of processes, selecting a resource from the resource list, when a version of the resource does not already exist, creating a new version of the resource, and setting a reference count corresponding to the new version to a first value, when the version of the resource already exists but is not a latest version of the resource, creating the new version of the resource, decrementing a value of a reference count corresponding to the version of the resource, and setting the reference count corresponding to the new version to the first value, when the version of the resource already exists and is a latest version of the resource, incrementing the value of the reference count corresponding to the version of the resource and not creating the new version of the resource, and adding the version of the resource to a version list that is sent to the process.

2. The computer-implemented method of claim 1 wherein the resource is one or more of the following: source code, a file, a document, a library, an archive, an object, a data structure, a database, a process, a service, and a deployment descriptor.

3. The computer-implemented method of claim 1, further comprising: deleting the version of the resource if no processes in the plurality of processes require access to it.

4. The computer-implemented method of claim 1, wherein the notifying is dynamic.

5. The computer-implemented method of claim 1, wherein a first process and a second process in the plurality of processes can require access to the same resource.

6. The computer-implemented method of claim 1, wherein a process in the plurality of processes is part of an integrated development environment.

7. A computer system for sharing a set of resources among a plurality of clients, comprising:

a version manager capable of creating a version of a resource for each one of the plurality of processes that requires access to the resource wherein a version of the resource is one of: 1) a representation of the resource at a particular point in time; and 2) a transformation of the resource; and a resource manager capable of registering the set of resources and notifying a process in the plurality of processes when a resource in the set of resources upon which the process requires access is updated, wherein the version manager is further configured to:

receive a resource list from a process of the plurality of processes, select a resource from the resource list, when a version of the resource does not already exist, create a new version of the resource, and set a reference count corresponding to the new version to a first value, when the version of the resource already exists but is not a latest version of the resource, create the new version of the resource, decrement a value of a reference count corresponding to the version of the resource, and set the reference count corresponding to the new version to the first value, when the version of the resource already exists and is a latest version of the resource, increment the value of the reference count corresponding to the version of the resource and not create the new version of the resource, and add the version of the resource to a version list that is sent to the process.

8. The computer system of claim 7, further comprising: persistent storage capable of saving the state of one or more of the version manager and the resource manager.

9. The computer system of claim 7, wherein the resource is one or more of the following: source code, a file, a document, a library, an archive, an object, a data structure, a database, a process, a service, and a deployment descriptor.

10. The computer system of claim 7, further comprising: deleting the version of the resource if no processes in the plurality of processes require access to it.

11. The computer system of claim 7, wherein the notifying is dynamic.

12. The computer system of claim 7, wherein a first process and a second process in the plurality of processes can require access to the same resource.

13. The computer system of claim 7, wherein a process in the plurality of processes is part of an integrated development environment.

14. A machine readable storage medium having instructions stored thereon to cause a computer system to:

for each resource in a set of resources, create a version of a resource for each one of a plurality of processes that requires access to the resource wherein a version of the resource is one of: 1) a representation of the resource at a particular point in time; and 2) a transformation of the resource;

make each of the created versions available to the plurality of processes; and notify a process in the plurality of processes when a resource in the set of resources upon which the process requires access is updated, wherein the creating the version of the resource further comprises:

receiving a resource list from a process of the plurality of processes, selecting a resource from the resource list, when a version of the resource does not already exist, creating a new version of the resource, and setting a reference count corresponding to the new version to a first value, when the version of the resource already exists but is not a latest version of the resource, creating the new version of the resource, decrementing a value of a reference count corresponding to the version of the resource, and setting the reference count corresponding to the new version to a first value, when the version of the resource already exists and is a latest version of the resource, incrementing the value of the reference count corresponding to the version of the resource and not creating the new version of the resource, and adding the version of the resource to a version list that is sent to the process.

* * * * *